United States Patent [19]

Lok et al.

[11] Patent Number: 4,524,199
[45] Date of Patent: Jun. 18, 1985

[54] STABLE POLYMERIC DISPERSION AND METHODS FOR MAKING

[75] Inventors: Kar P. Lok, Toronto; Christopher K. Ober, Oakville, both of Canada

[73] Assignee: Xerox Corporation, Stamford, Conn.

[21] Appl. No.: 549,933

[22] Filed: Nov. 9, 1983

[51] Int. Cl.³ .............................. C08G 3/20; C08F 2/22
[52] U.S. Cl. .................................. 527/313; 527/314; 526/909
[58] Field of Search .................. 527/313, 314, 315; 526/238.2, 238.21, 909

[56] References Cited

U.S. PATENT DOCUMENTS

| | | | |
|---|---|---|---|
| 3,542,681 | 11/1970 | Mutaffis | 252/62.1 |
| 3,554,946 | 1/1971 | Okuno et al. | 252/62.1 |
| 3,591,537 | 7/1971 | Squire et al. | 260/17 |
| 3,623,986 | 11/1971 | Machida et al. | 252/62.1 |
| 3,625,897 | 12/1971 | Machida | 252/62.1 |
| 3,767,603 | 10/1973 | Koyanagl et al. | 260/17 A |
| 3,890,240 | 1/1975 | Hockberg | 252/62.1 |
| 3,900,412 | 8/1975 | Kosel | 252/62.1 |
| 3,941,729 | 3/1976 | Klein | 260/17 A |
| 3,976,583 | 8/1976 | Herrman et al. | 252/62.1 L |
| 3,990,980 | 11/1976 | Kosel | 430/114 |
| 4,058,470 | 11/1977 | Moschovis et al. | 252/62.1 L |
| 4,077,804 | 3/1978 | Vanzo | 96/1 SD |
| 4,081,391 | 3/1978 | Tsubuko et al. | 252/62.1 L |
| 4,087,393 | 5/1978 | Tsubuko et al. | 260/27 R |
| 4,232,135 | 11/1980 | Bentley et al. | 525/509 |
| 4,247,434 | 1/1981 | Vanderhoff et al. | 524/458 |
| 4,417,025 | 11/1983 | Toba et al. | 527/315 |
| 4,459,378 | 7/1984 | Ugelstad | 523/205 |

FOREIGN PATENT DOCUMENTS 0010986 5/1980 European Pat. Off.

OTHER PUBLICATIONS

Kinetics of Polymerization in Dispersed Systems, Levy et al., Impac Macro–1982.
Monodisperse Polymeric Spheres in the Micron Size Range by a Single Step Process, The British Polymer Journal–Dec. 1982.
Polyelectrolyte Stabalised Latices–Part I Preparation, Elsevier Scientific Publishing Co. 1981.
Absorption of Low Molecular Weight Compounds in Aqueous Dispersions by Polymer Oligmer Particles 2a, Makromol Chem. 180, 1979.
Large Size Monodisperse Latexes as Chemical Space Product, NSA Technical Memorandum–Aug. 1977.

Primary Examiner—John Kight
Assistant Examiner—Nathan M. Nutter

[57] ABSTRACT

Dry monodispersed polymeric particles, a stabilized dispersion of such and a method for making are described. The dispersion comprises a polar dispersion medium having dispersed therein monodispersed particles comprising a thermoplastic resin core substantially insoluble in the dispersion medium formed from a styrene or butylmethacrylate containing monomer or mixtures thereof and having irreversibly anchored thereto, a nonionic amphipathic steric stabilizer comprising a graft copolymer having a portion formed from a styrene or butylmethacrylate containing monomer or mixture thereof and a portion formed from hydroxyethyl cellulose, hydroxypropyl cellulose, hydroxybutyl methyl cellulose, hydroxypropyl methyl cellulose, ethyl cellulose or cellulose propionate. The stable dispersion is made by dissolving the nonionic cellulose ether in the polar dispersion medium and in the presence of a free radical initiator adding styrene or butylmethacrylate containing monomer a mixture thereof thereto, and permitting polymerization to take place.

21 Claims, No Drawings

STABLE POLYMERIC DISPERSION AND METHODS FOR MAKING

REFERENCE TO RELATED APPLICATION

Reference is hereby made to copending application Ser. No. 499,054 entitled "Dyed Stabilized Liquid Developer and Method for Making" filed May 25, 1983 in the name of Melvin D. Croucher et al.

BACKGROUND OF THE INVENTION

The present invention relates generally to particles and in particular to stable dispersions of polymeric particles and methods for making them. In particular the present invention is directed to the manufacture of polymeric particles and stable dispersons containing same which are useful in the manufacture of paper. In addition, these materials can be tailored to function as a dry toner or a liquid developer.

Synthetic dispersions or latices are widely used today in a variety of applications extending from marking materials to paints, adhesives, paper finishing materials, and other film forming layers. In making such dispersions for use in electrostatographic marking materials, it is desirable, for example, to have a very narrow particle size distribution in the particles so as to be able to control the particle size to within and around the 8 to 10 micron range, thereby avoiding any subsequent classification step. Conventional emulsion or suspension polymer preparation techniques previously used do not allow the control of particle sizes within that size range and do not provide the narrow particle size distribution required. Typically, both emulsion and suspension polymerization start out with a monomer which is insoluble in the dispersion medium and colloidal in the case of emulsion polymerization. While the emulsion polymerization process may provide stable suspension, the particles are generally submicron in size. In contrast, with the typical suspension polymerization techniques one medium ends up being more or less uniformly dispersed or suspended in the other while the smallest particle size generally achievable is of the order of 50 to several hundred microns in diameter.

PRIOR ART

Recently, latices containing spherical polymeric particles in the low micron size range have been prepared by dispersion polymerization techniques. Levy and Almog, in their article, "Kinetics of Polymerization in Dispersed System", discussed the kinetics of dispersion polymerization of styrene and methyl methacrylate and the dependence thereof on the surfactant used. In particular, polyvinyl alcohol is described as a steric stabilizer and simultaneously sodium dodecyl sulfate is used as an electrostatic stabilizer. Almog, Reich and Levy in their article entitled "Monodisperse Polymeric Spheres in the Micron Size Range by Single Step Process" describe the preparation of monodispersed polystyrene spheres in the micron size range by a single step process wherein the polymerization is carried out in an alcohol with a steric stabilizer such as polyvinyl pyrrolidone in combination with a quaternary ammonium salt which is believed to act as an electrostatic costabilizer. The extent of monodispersity improvement achieved by the presence of the quaternary ammonium salt is dependent upon a number of factors including the type of monomer and the nature and amount of surfactant.

Corner, in his article, "Polyelectrolyte Stabilised Latices Part 1, Preparation" describes some polyelectrolyte stabilized latices and in particular polystyrene latex dispersion prepared by the dispersion polymerization of styrene in alcohol water mixtures containing polyelectrolyte such as polyacrylic acid. The latex particles are believed to be sterically and electrostatically stabilized by the polyelectrolyte molecules which are irreversibly bound to them. The influence of styrene concentration; polyelectrolyte type, molecular weight and concentration; alcohol water ratio, and initiator concentration on the ultimate particle size and surface charge density are discussed.

These dispersions produced by Levy et al. and Corner are to a large extent stabilized by electrostatic forces and therefore their stability is very sensitive to additives especially charged ones. The use of such additives is commonly practiced in industries to make satisfactory paper modifier or marking materials. These dispersions therefore have limited application in such uses.

SUMMARY OF THE INVENTION

Accordingly, it is an object of the present invention to provide a stable polymer latex dispersion.

It is a further object of the present invention to provide improved monodispersed polymer particles.

It is a further object of the present invention to provide polymer particles such as electrostatographic toner, which may be used as marking material.

It is a further object of the present invention to provide polymer particles suitable for use in paper manufacturing to control the physical and optical properties of the resulting paper.

It is a further object of the present invention to provide a stable dispersion of polymer particles wherein said particles are stabilized with a nonionic amphipathic steric stabilizer.

It is a further object of the present invention to provide a dispersion of polymer particles which remain stable over extended periods of time.

It is a further object of the present invention to provide a nonionic dispersion to which functional additives can be introduced without changing the colloidal stability of the dispersion.

The above objects and others are accomplished in accordance with the present invention wherein dry polymer particles, a stable dispersion thereof in a polymer dispersion medium, and a method for making said dispersion are provided. In particular, the stable dispersion comprises a polar dispersion medium having dispersed therein monodispersed particles comprising a thermoplastic resin core substantially insoluble in the dispersion medium formed from a styrene or butylmethacrylate containing monomer or mixtures thereof having irreversibly anchored thereto a nonionic amphipathic steric stabilizer comprising a graft copolymer having a portion formed from a styrene of butylmethacrylate containing monomer or mixtures thereof and a portion formed from a cellulose derivative comprising hydroxyethyl cellulose, hydroxypropyl cellulose, hydroxybutyl methyl cellulose, hydroxpropyl methyl cellulose, ethyl cellulose or cellulose propionate.

The stable dispersion according to the present invention, is made by adding the nonionic cellulose ether to a polar dispersion medium and, in the presence of the free radical initiator, adding the selected monomer or monomers to the dispersion medium and permitting polymerization to take place. During polymerization the graft copolymer is formed and irreversibly attaches itself in a hairy like configuration to the surface of the styrene or methacrylate polymer as it is being polymerized. The dry monodispersed polymer particles are obtained by drying the dispersion wherein the nonionic steric stabilizer is present as a sheath anchored to the surface. In a specific application the particles comprise a polystyrene resin core having as a steric stabilizer a graft copolymer of polystyrene grafted with hydroxypropyl cellulose.

DESCRIPTION OF THE PREFERRED EMBODIMENT

The stable dispersion is basically a latex that constitutes a colloidal suspension of a synthetic resin in a liquid. In particular it includes a continuous liquid phase, (the dispersion medium) together with a dispersed phase, the steric stabilized thermoplastic resin particle. For a further discussion of the details of the present invention, it may be helpful to define certain terms which may be repeatedly used. By the term "sterically stabilized" it is intended to define a particle that will remain dispersed in the dispersion medium by virtue of the attractive forces between adjacent polymer particles in the dispersion medium being screened by the steric stabilizer on the polymer particles. This steric stabilizer creates its own repulsive interaction between polymer particles which maintains their separation from each other. The steric stabilizer may be described as being "amphipathic" in nature by which it is meant that a portion of it has an affinity for one material and another portion has an affinity for another material. In our specific embodiment, the amphipathic stablizer has a moiety which is solvated by (soluble in) the dispersing medium and a moiety which is nonsolvated by (insoluble in) the dispersing medium. In our preferred stabilizer, the moiety which is solvated by the dispersion liquid is a nonionic cellulose derivative such as hydroxypropyl cellulose, and the moiety which is nonsolvated by the dispersion medium is the styrene or butylmethacrylate moiety. The part of the stabilizer soluble in the dispersion medium forms a protective barrier around the particle of nonsolvated moieties adsorbed or incorporated into the thermoplastic resin core thereby anchoring the solvated moiety to the resin core.

The particle which is dispersed in the dispersion medium in the practice of the present invetion comprises a synthetic resin core which is insoluble in the dispersion medium and which has irreversibly anchored a solvated steric barrier or stabilizer by which we mean that the steric stabilizer is attached or bound either physically or chemically to the synthetic resin core such that it cannot leave the resin core. This stabilizer facilitates the adhesion of the particle to the paper surface in the case of paper modifying. Of course, the marking particle may be colored by a suitable dye and if it is to be used as an electrostatographic developer particle, have a charge control agent present on its surface.

The particles are essentially monodispersed by which we mean that they are generally about the same size and shape having a relatively narrow size distribution. Typically, the monodispersed particles have a size within the range of from about 0.3 microns to about 15 microns and preferrably when used as marking materials have a size within the range from about 8 microns to about 10 microns. The dispersion polymerization process by which the particles are made provides for a well controlled particle size distribution. Typically the particles that may be used in electrostatographic marking applications actually have 95% of the particles within the 8 to 10 micron range. In addition, the monodispersed particles are generally spherical in shape.

The stable dispersions formed with the present dispersion polymerization procedures may be made with any suitable polar dispersion medium. In this regard by polar dispersion medium we intend to mean any solvent or solvent combinations which has sufficient dipole to render insoluble any of the relatively nonpolar polymer produced during the dispersion polymerization. Typical materials include mixtures of water with alcohols such as methanol, ethanol, propanol and butanol as well as combinations of water or alcohol with ether such as tetrahydrofuran, methoxy ethanol and dimethoxyethane. Any suitable ratio may be used. In the case of water-alcohol system it has been determined that the particle size becomes larger and the size distribution wider as water is replaced by an alcohol. Of course in the dispersion polymerization reaction the monomer should form a homogeneous solution with the dispersion medium so that there is no separate monomer phase provided. Typically however, water is present in amounts of 35% by volume to maintain the homogeniety of the system. The resulting polymer formed according to the reaction however in order to provide a stable dispersion of monodispersed particles has to be insoluble in the dispersion medium.

Any suitable monomer may be used to form the core of the particles in this dispersion. Typical monomers include styrene or butylmethacrylate containing monomers such as chloromethylstyrene, isoprene, butadiene 2-methylstyrene, vinyltoluene, vinylacetate, methyl methacrylate, lauryl methacrylate, acrylonitrile, maleic anhydride, vinyl sterate, vinyl pryidine and related compounds. Preferred group of materials of course are styrene and butylmethacrylate or mixtures thereof which can be used to form polymer particles comprising polystyrene, poly(butylmethacrylate) or copolymers of polystyrene and poly(butylmethacrylate). The mechanical and thermal properties of the particle can be altered or varied by the selection of the monomer used in forming the polymer core of the particle. For example, a styrene containing monomer will generally yield a polymer providing a relatively hard core whereas a monomer containing butylmethacrylate generally provides a relatively soft core. Of course, ratios of styrene and butylmethacrylate may be used to thereby control both the glass transition temperature and the degree of mechanical rigidity of the polymer particle formed. These properties will dictate the performance of the polymer particles for their selected application. These properties can also be controlled by the molecular weight of the resulting polymer by way of varying the monomer proportions. Typically the polymers formed in the dispersion polymerization process according to the present invention have weight average molecular weights from about 10,000 to 250,000.

The nonionic amphipathic stabilizer which is irreversibly anchored to the synthetic resin core may be made of any suitable material. Typically it involved a graft copolymer having a moiety with an affinity for being solvated by the dispersion medium and having another moiety having an affinity for the synthetic resin core. Typically the nonionic amphipathic stabilizer has a weight average molecular weight in the range from about 10,000 to about 1,000,000, and comprises a graft copolymer having a portion formed from a styrene or butylmethacrylate containing monomer or mixture thereof and a portion formed from a cellulose derivative comprising cellulose ethers such as hydroxyethyl cellulose, hydroxypropyl cellulose, hydroxybutylmethyl cellulose and hydroxypropylmethyl cellulose or cellulose propionate. A preferred nonionic amphipathic steric stabilizer is a graft copolymer of polystyrene grafted with hydroxypropyl cellulose. With the use of nonionic materials such as the cellulose ethers, mentioned above, no charged species are present in the dispersion and therefore no electrostatic stabilization is necessary. As a result, additives for various purposes may be added to the system without disturbing the electrostatic stability or creating a difficulty with regard to charged species. Typically the cellulose derivatives employed in making the stabilizer have molecular weights of the order of between 60,000 to about 1,000,000, it being noted that particle size of the resins obtained increaes slightly with higher molecular weight of cellulose derivatives. Of course the monomer used for the insoluble portion of the graft copolymer is the same monomer used in forming the polymer core, namely styrene and butylmethacrylate or mixtures thereof.

The stable dispersions of the present invention may be made with any suitable dispersion polymerization technique which starts out with a clear homogeneous solution of monomer in the dispersion medium with no separate monomer phase being formed. Typically, the polymerization takes place in the presence of an initiator such as azobisbutyronitrile (AIBN) or benzoyl peroxide and is carried out at temperatures ranging from 50° C. to 95° C. At temperatures less than about 50° C. the monomer may not be completely polymerized, the polymerization may be slow, and the particle size distribution may be wide spread. At temperatures greater than about 95° C. the particles may start to flocculate or coagulate. It should be noted that benzoyl peroxide is a preferred free radical initiator because of its high grafting efficiency. The polymerization may take place in situ with the monomer, free radical initiator and nonionic cellulose derivatives having been added serially to the dispersion medium. Alternatively, a small amount of the graft copolymer can be formed initially by the addition of a small amount of the monomer from which the core polymer will be made, followed by subsequent addition of the bulk of the core polymer monomer. With either procedure stable dispersions with similar particle size and particle size distribution are obtained. However, it should be noted that the procedure with the initial grafting does generally provide more graft copolymers. Generally, it has been determined that with increasing concentration of monomer in the dispersion medium the average particle size obtained becomes larger. In addition, an increased concentration of the cellulose derivatives generally results in a smaller particle size. Preferably the monomer, styrene in particular, is present in a dispersion in an amount greater than 15% by volume, since lower concentration of monomer provide greater particle size distribution and therefore reduced monodispersity.

During the polymerization procedure, the nonionic amphipathic stabilizer becomes intimately bound to the synthetic resin core. By intimately bound we intend to define those chemical as well as physical interactions that irreversibly anchor the amphipathic stabilizer in such a way that it cannot leave the particle under normal operating conditions. For example, it is entirely proper to characterize the stabilizer as being adsorbed by the polymer core onto the polymer core surface.

Upon conclusion of the polymerization reaction, it is found that the cellulose derivative is irreversibly adsorbed onto the stabilized polystyrene.

Dry polymer particles may be obtained by either evaporating off all the volatile materials or by freeze drying the dispersion after the alcohol in the system has been distilled off. The evaporation process leaves the particles in the form of a white cake, while the freeze drying process produces a fluffy material. When the particles are dried the stabilizer forms a smooth sheath on the particle surface. Both types of material are readily dispersed into alcohol, water and water-alcohol mixtures to give milky dispersions. The reconstituted dispersions are also colloidally stable but tend to settle slightly faster than the original dispersions. The particle size and particle size distribution remain essentially identical after redispersion.

Furthermore dispersions produced according to the present invention which have been left to stand in a laboratory for a year, exhibit remarkable colloidal stability and that any sediment produced could be readily redispersed into the supernatant by shaking. The particle size and particle size distribution remained unchanged and no aggregated polymer was observed.

While not wishing to be bound to any theory, the mechanism of the present dispersion polymerization is probably similar to that dispersion polymerization using polyelectrolytes described by Corner and analogous to non-aqueous dispersion polymerization in general. (See Barrett, "Dispersion Polymerization in Organic Medium", Wiley, N.Y.(1975). The polymerization starts out as a clear homogeneous solution with no separate monomer phase. As tiny particle nuclei are formed, the reaction mixture becomes opalescence and exhibits Tyndall phenomenon. It then turns to a milky dispersion as the particles become larger. At the beginning of the polymerization, soluble styrene oligomers for example, are formed along with a certain amount of graft copolymer stabilizer. The generation of free radical sites on the cellulose derivative is possible through hydrogen abstraction. These free radical sites may then function as growth centers which upon additional polymerization of styrene yield the graft copolymer. The formation of grafted cellulose derivatives under free radical generating conditions is well known. As the polystyrene units grow, for example, and become insoluble in the medium, aggregates of polystyrene are formed. Particles at this stage have two features associated with them. They are swollen with monomer and they are stabilized by the graft copolymer adsorbed on their surfaces. These particles continue to grow until there is no more monomer to sustain polymerization. The fact that the particle surface is very smooth, as revealed by scanning electron micrographs, suggest that polymerization continues to take place in the particles once they have formed. If the particle growth has been largely dependant upon the aggregation of newly formed polymer oligomer such smooth surfaces would not be expected. The particles are prevented from flocculation by the anchored cellulose moiety of the steric stabilizer. These dispersions can be described as being comprised of a hydrophobic polystyrene core, for example, sterically stabilized by solublized hydrophilic hydroxypropyl cellulose chains, for example, which provides a nonionic system and thereby renders the dispersion tolerable to both ionic and nonionic additives which renders them useful in many applications. Once the stable dispersion of marking particles has been prepared it may be colored according to any suitable technique and subsequently the dispersion dried to yield colored marking toner particles which may be used in the development of electrostatic latent images on recording members. A particularly preferred technique for dyeing the marking particles involves the dye imbibition technique based upon dye transport with a solvent carrier described in U.S. patent application Ser. No. 499,054 copending herewith wherein the dye is molecularly incorporated into the core particles by an absorbtion technique. For example, nonpolar organic solvents may be specifically absorbed into the core of the particle produced from dispersion polymerization procedure and by dissolving a dye into such a solvent that the dye is readily imbibed or absorbed into the polymer core. The solvent used should be essentially insoluble in the dispersion medium otherwise some of the dye may go into the dispersion medium increasing the possibility of deposition in background areas. We have found that, numerous organic solvents and mixtures of these solvents such as toluene, xylene, cyclohexane, hexane, octane, dichloromethane, chloroform, 1,1,1-trichloroethane are suitable for this purpose. We prefer to use toluene as a solvent for the dyes since it may be desirable if not necessary in some instances to remove the absorption fluid from the particles and this can be readily removed by simple heating or distillation. Typical dyes that may be used which are highly soluble in the solvent and insolvent in the dispersion medium include: Sudan Black (Fisher), Sudan I (Aldrich), Sudan II (Aldrich), Yellow Dyes (Banco), Oil Blue A (DuPont), Methyl Voilet 2B (Aldrich), Sudan Red BB (BASF), Sudan Orange G (Aldrich), Oil Red O (Aldrich), Paraphenylazophenol (Aldrich), Rose Bengal (Aldrich), 4'5'-Dibromofluoroscein (Aldrich), Calco Oil Red A-1700 (Pylam), Oil Yellow 720821 (Pylam), Oil Black 720822 (Pylam), Oil Brown 102 (Passiac), Oil Red 234 (Passiac), Oil Black 3-1170 (Passiac).

EXAMPLES ACCORDING TO THE INVENTION

The invention will now be described with reference to the following specific examples. Unless otherwise indicated all parts and percentages are by weight.

In the Examples, the hydroxypropyl cellulose was obtained from Scientific Polymer Products, Inc. Ontario, N.Y., the styrene was purchased from Eastman Kodak, Rochester, N.Y. and was treated with 5% w/w sodium hydroxide and distilled under reduced nitrogen pressure before use. Benzoyl peroxide was purchased from Aldrich Chemical Company, Milwaukee, Wis. Ethanol (denatured) from MCB Manufacturing Chemists, Inc. Norwood, Ohio, and methanol (reagent grade) from J. T. Baker Chemical Co. Phillipsburg, N.J., were used without further purification. Methyl cellosolve from British Drug House (BDH), Toronto Can. Hydroxyethyl cellulose from Polysciences, Inc., Warrenton, Pa. Water was deionized before use.

EXAMPLES 1-4

Hydroxypropyl cellulose (MW 100,000, 1 part per 10 parts total styrene monomer used) was dissolved in a solution of 780 ml of alcohol-water mixed in the proportions shown in Table 1. The resulting solution was heated at 78° C. and nitrogen was bubbled through the solution for two hours. Benzoyl peroxide (0.2 g) was then added. Heating at 78° C. was continued for 5 hours followed by the addition of 1 ml of styrene. This grafting stage was allowed to proceed at 70° C. for an additional 16 hours. The solution remained clear at this stage.

The remaining styrene monomer (grams monomer listed in Table 1) was then added along with benzoyl peroxide (1 part per 50 parts monomer). The temperature was then raised to 85° C. and polymerization was allowed to continue for 6 hours. A milky dispersion was obtained and there was no smell of styrene.

EXAMPLES 5-9

The stabilizer, hydroxypropyl cellulose with the molecular weight and relative amount given in Table 1 was dissolved in 800 mls ethanol-water having a 3:1 volume ratio. The system was purged with nitrogen for 1 hour and was heated at 80° C. Benzoyl peroxide (1 part per 50 parts total styrene monomer used) was added. After 1 hour, styrene monomer (the quantity listed in Table 1) was introduced all at once and polymerization was continued for 14 hours at 78° C. A stable milky latex dispersion was obtained.

Latex dispersions prepared by the above methods with styrene monomer and hydroxypropyl cellulose are tabulated in Table 1. In each instance a stable milky latex dispersion was obtained.

TABLE 1

| Example | stabilizer precurser | stabilizer to core ratio* | medium (ratio) | Total amount of solvent (ml) | monomer used (g) | solid content,[2]% |
|---|---|---|---|---|---|---|
| 1 | Hydroxypropyl Cellulose (M.W $1 \times 10^5$) | 1:10 | EtOH—H$_2$O 1.8-1.0 | 780 | 50 | 6 |
| 2 | Hydroxypropyl Cellulose (M.W $1 \times 10^5$) | 1:10 | MeOH—H$_2$O 1.8-1.0 | 780 | 50 | 6 |
| 3 | Hydroxypropyl Cellulose (M.W $1 \times 10^5$) | 1:10 | MeOH | 780 | 50 | 6 |
| 4 | Hydroxypropyl Cellulose (M.W $1 \times 10^5$) | 1:10 | EtOH—H$_2$O 3.0-1.0 | 780 | 150 | 16 |
| 5 | Hydroxypropyl Cellulose (M.W $6 \times 10^4$) | 1:10 | EtOH—H$_2$O 3.0-1.0 | 800 | 100 | 12 |
| 6 | Hydroxypropyl Cellulose (M.W $3 \times 10^5$) | 1:10 | EtOH—H$_2$O 3.0-1.0 | 800 | 100 | 12 |
| 7 | Hydroxypropyl Cellulose (M.W $1 \times 10^6$) | 1:10 | EtOH—H$_2$O 3.0-1.0 | 800 | 50 | 6 |

TABLE 1-continued

| Example | stabilizer precurser | stabilizer to core ratio* | medium (ratio) | Total amount of solvent (ml) | monomer used (g) | solid content,[2]% |
|---|---|---|---|---|---|---|
| 8 | Hydroxypropyl Cellulose (M.W $1 \times 10^5$) | 1:10 | EtOH—$H_2O$ 3.0–1.0 | 800 | 250 | 22 |
| 9 | Hydroxypropyl Cellulose (M.W $1 \times 10^5$) | 1:10 | EtOH—$H_2O$ 3.0–1.0 | 800 | 400 | 35 |

*based on weight
[2]based on W/V polymer content by weight in volume of dispersion.

TABLE 2 tabulates the effect of the molecular weight of hydroxypropylcellulose on the viscosity of the dipersion

| Example | Molecular Weight of HPC used | Solid Content, (%) | Viscosity (cP) |
|---|---|---|---|
| 4 | 100,000 | 16 | 31 |
| 5 | 60,000 | 12 | 12.5 |
| 6 | 300,000 | 12 | 61 |
| 7 | 1,000,000 | 6 | 335 |

TABLE 3 tabulates the effect of the dispersion medium on the viscosity of the dispersion

| Example | Stabilizer | Solid Content, (%) | Medium | Medium Viscosity (cP) | Dispersion Viscosity (cP) |
|---|---|---|---|---|---|
| 1 | Hydroxypropyl Cellulose (M.W $1 \times 10^5$) | 6 | ethanol-$H_2O$ 1.8–1.0 | 3.5 | 6.5 |
| 2 | Hydroxypropyl Cellulose (M.W $1 \times 10^5$) | 6 | methanol-$H_2O$ 1.8–1.0 | 2.5 | 3.5 |
| 3 | Hydroxypropyl Cellulose (M.W $1 \times 10^5$) | 6 | MeOH | 1.5 | 2.0 |

TABLE 5 tabulates a comparison of the particle size between the original latex and redispersed samples

| Example | Original Dispersion | Redispersion in $H_2O$ | Redispersion MeOH | Redispersion in EtOH |
|---|---|---|---|---|
| 3 | 1.28 um (3) 1.36 um | 1.35 um (3) 1.36 um | 1.280 um (5) 1.28 um | 1.20 um (3) |
| 4 | 1.17 um (3) | 1.21 um (4) | 1.23 um (3) | 1.17 um (3) |
| 8 | 1.42 um (0) | 1.53 um (1) | 1.40 um (1) | 1.45 um (1) |
| 9 | 2.06 um (1) | 2.11 um (1) | 2.02 um (1) | 2.15 um (1) |

NOTE:
Numbers in parenthesis represent the degree of polydispersity of the dispersion and redispersion as determined on a Coulter Nanosizer. The lower the number the narrower the dispersity with 0, 1, 2, having very narrow particle size distribution and 8 and 9 having a wide particle size distribution.

The same general recipe was used for the three reactions reported below:

Hydroxypropylcellulose (HPC, Scientific—Polymer Products, MW=100,000) was dissolved at 65° C. with stirring in a 3-necked round bottomed flask in methyl cellosolve (MeCell, BDH Omnisolve) and ethanol (EtOH, BDH Omnisolve). Under nitrogen atmosphere a solution of benzoyl peroxide (BPO, Aldrich) dissolved in styrene monomer (Aldrich) was added all at once. The reaction clouded after several minutes.

After two hours of heating, the mixture consisted of monodisperse spheres in suspension. The temperature was raised to 75° C. and the heating continued for 48 hours. The particles were isolated by centrifugation followed by dispersion in water and were then freeze dried.

TABLE 4 tabulates particle size and distribution of the dispersions

| Example | Stabilizer Precursor | Medium (ratio) | Solid Content, % | Particle size and distribution (diameter) Electron Miscroscopy | Photon correlation Spectroscopy* | Ccoulter Nano-sizer[2] |
|---|---|---|---|---|---|---|
| 1 | Hydroxypropyl Cellulose (M.W $1 \times 10^5$) | EtOH—$H_2O$ (1.8–1.0) | 6 | 0.5–1.0 um (mostly 0.7–0.9 um) | 0.82 um | 0.84 um (2)[3] |
| 2 | Hydroxypropyl Cellulose (M.W $1 \times 10^5$) | MeOH—$H_2O$ (1.8–1.0) | 6 | 1.0 um (5.0 um) | 0.99 um | 1.13 um (5) |
| 3 | Hydroxypropyl Cellulose (M.W $1 \times 10^5$) | MeOH | 6 | 1.0 um | 1.36 um (MeOH) | 1.38 um (3) |
| 4 | Hydroxypropyl Cellulose (M.W $1 \times 10^5$) | EtOH—$H_2O$ (3.0–1.0) | 16 | — | 0.89 um | 1.07 um (3) |
| 5 | Hydroxypropyl Cellulose (M.W $6 \times 10^4$) | EtOH—$H_2O$ | 12 | — | 0.82 um | 0.96 um (0) |
| 6 | Hydroxypropyl Cellulose (M.W $3 \times 10^5$) | EtOH—$H_2O$ (3.0–1.0) | 12 | — | 0.90 um | 1.14 um (6) |
| 7 | Hydroxypropyl Cellulose (M.W $1 \times 10^6$) | EtOH—$H_2O$ ((3.0–1.0) | 6 | — | 1.20 um | 1.23 um (4) |
| 8 | Hydroxypropyl Cellulose (M.W $1 \times 10^5$) | EtOH—$H_2O$ (3.0–1.0) | 22 | — | 1.32 um | 1.42 um (0) |
| 9 | Hydroxypropyl Cellulose (M.W $1 \times 10^5$) | EtOH—$H_2O$ (3.0–1.0) | 35 | — | — | 2.06 um (1) |

*all measurements done in water except specified
[2]all measurements done in ethanol-water 1:1
[3]polydispersity parameter, 0, 1, 2 - essentially mono-sized system, 8, 9 - wide particle size range

EXAMPLE 10

| HPC | 7.5 parts |
|---|---|
| BPO | 3.0 parts |
| Styrene | 68 parts |
| MeCell | 241 parts |
| EtOH | 138 parts |

The resulting particle diameter as measured by Coulter Counter was 9.1 μm with GSD (Geometric Standard Deviation) of 1.07.

EXAMPLE 11

| HPC | 7.5 parts |
|---|---|
| BPO | 3.0 parts |
| Styrene | 68 parts |
| MeCell | 207 parts |
| EtOH | 168 parts |

The particle diameter was 6.2 μm with a GSD (Geometric Standard Deviation) of 1.13.

EXAMPLE 12

| HPC | 7.5 parts |
|---|---|
| BPO | 3.0 parts |
| Styrene | 68 parts |
| MeCell | 121 parts |
| EtOH | 237 parts |

Particle diameter was 2.7 μm, GSD (Geometric Standard Deviation) was 1.11.

EXAMPLE 13

Hydroxypropyl cellulose (HPC) was dissolved in ethanol (EtOH) and tetrahydrofuran (THF, BDH Omnisolve) at 65° C., and then a solution of benzoyl peroxide (BPO) in styrene monomer was added. After reacting for 48 hours, a volume equal to 1.5 times the volume of THF was distilled off. The resulting particles were 8 μm in diameter with a narrow size distribution as observed by optical microscopy.

| HPC | 7.5 parts |
|---|---|
| BPO | 3.0 parts |
| Styrene | 68 parts |
| EtOH | 276 parts |
| THF | 60 parts |

EXAMPLE 14

Hydroxypropyl cellulose (HPC) was dissolved in a mixture of dimethoxyethane (DME, Aldrich) and ethanol (EtOH) and then under nitrogen atmosphere benzoyl peroxide (BPO) dissolved in styrene monomer was introduced. The temperature of the reaction was maintained at 65° C. After reacting for 48 hours, the size of the particles were 4 μm in diameter with a narrow size distribution as observed by optical microscope.

| HPC | 7.5 parts |
|---|---|
| BPO | 3.0 parts |
| Styrene | 68 parts |
| EtOH | 276 parts |
| DME | 65 parts |

EXAMPLE 15

Ethyl cellulose (Scientific Polymer Products) was dissolved with stirring in methyl cellosolve (McCell) and ethanol (EtOH) at 65° C. under nitrogen atmosphere. Then a mixture of benzoyl peroxide (BPO) in styrene monomer was added and after 2 hours the temperature was raised to 75° C. At the end of 48 hours reaction time, the particles were 3 to 7 μm in diameter with a very narrow size distribution.

| Ethyl Cellulose | 7.5 parts |
|---|---|
| BPO | 3.0 parts |
| Styrene | 68 parts |
| EtOH | 237 parts |
| MeCell | 121 parts |

EXAMPLE 16

Cellulose propionate (Scientific Polymer Products, low molecular weight) was dissolved in methyl cellosolve (MeCell) and ethanol (EtOH) at 65° C. in a 3-necked round bottomed flask under nitrogen atmosphere. A mixture of benzoyl peroxide (BPO) in styrene monomer was then added, and after 2 hours the temperature was raised to 75° C. The size of the particles after 48 hours of reaction was 8 to 9 μm, and the dispersion gave no smell of styrene indicating the polymerization was essentially completed.

| Cellulose Propionate | 7.5 parts |
|---|---|
| BPO | 3.0 parts |
| Styrene | 68 parts |
| EtOH | 237 parts |
| MeCell | 121 parts |

EXAMPLE 17

Hydroxypropyl cellulose (5.0 g) was dissolved in ethanol (500 ml) and water (200 ml). The system was purged with nitrogen for 45 minutes and was heated at 80° C. Benzoyl peroxide (2.0 g) and butyl methacrylate (100 ml) was introduced. Polymerization was continued for 11 hours at 85° C. A stable dispersion was obtained. Scanning electron microscopy indicated that the particles were monodispersed spherical in shape and had a particle size distribution of 0.9–3.0 μm.

EXAMPLES 18–24

Hydroxypropyl cellulose (5.0 g) was dissolved in ethanol (500 ml) and water (200 ml). The system was purged with nitrogen for 45 minutes and was heated at 80° C. Benzoyl peroxide (3.0 g) and styrene and butyl methacrylate (total monomer weight 200 g) in the ratios are listed in Table 6 were introduced. Polymerization was continued for 15 hours at 85° C. Stable milky dispersions were obtained in each case. Scanning electron microscopy indicated that the particles were monodispersed spherical in shape and had a particle size distribution of 1.1–3.0 μm. Depending upon the composition of the monomer ratio, these particles had different glass transition temperatures as measured by differential scanning colorimetry (see Table 6).

TABLE 6

| EXAMPLE NO. | MONOMER | | GLASS TRANSITION TEMPERATURE |
|---|---|---|---|
| | STYRENE | BUTYL METHACRYLATE | |
| 18 | 190 g | 10 g | 95° C. |
| 19 | 180 g | 20 g | 83° C. |
| 20 | 160 g | 40 g | 76° C. |
| 21 | 120 g | 80 g | 52° C. |
| 22 | 100 g | 100 g | 43° C. |
| 23 | 60 g | 140 g | 32° C. |
| 24 | 20 g | 180 g | 28° C. |

EXAMPLE 25

Hydroxypropyl methyl cellulose (5.0 g) was dissolved in a mixture of ethanol (300 ml) and water (100 ml). The system was purged with nitrogen for 1 hour. Benzoyl peroxide (1.0 g) and styrene (50 g) were added. Polymerization was allowed to continue at 85° C. for 6 hours. A white, colloidally stable dispersion was obtained. Electron microscopy indicated that the particles had a size range of 1.7–2.5 μm.

EXAMPLE 26

A solution was obtained by dissolving hydroxybutyl methyl cellulose (5.0 g) in tert-butanol (600 ml) and water (200 ml). After purging the system with nitrogen, the temperature was raised to 85° C. Benzoyl peroxide (1.3 g) and styrene (50 g) were then added. Heating continued for 10 hours. The milky dispersion obtained had a particle size of 1.3–1.8 μm (electron microscopy).

EXAMPLE 27

Hydroxyethyl cellulose (low viscosity, 5% solution, 75–150 centipoise) 100 ml was added to 350 ml ethanol. The system was purged with nitrogen for roughly 30 minutes. After raising the temperature to 80° C. benzoyl peroxide (1.75 g) and styrene (100 g) were added. Polymerization was allowed to continue for 15 hours at 80° C. A milky dispersion was obtained. Monodispersed particles having a size of 2.4 microns using a Coulter Nanosizer were obtained.

The dispersion of polymeric latex particles made according to the practice of the present invention may also be used in the manufacture of paper as brighteners and opacifiers in modifying the papers. When these particles are applied to paper they provide improved opacity and brightness to the paper. In addition they are much lighter in weight than the typical conventional inorganic materials such as clay or titanium dioxide which have previously been used as paper modifiers. Furthermore, prior art materials such as clay or titanium dioxide require the use of binders to increase the binding ability of the particles to the paper substrate. With the dispersions prepared according to the present invention a self-binding effect with the paper has been achieved, and thus the use of a binding additive can be discontinued. The steric barrier maintains the polymer particle in the dispersion of the present invention as an individual entity and at the same time contributes to the paper binding nature.

The following illustrates the improved opacity and brightness achieved. Hydroxypropyl cellulose stabilized styrene was prepared according to Example 5 above. Following preparation of the dispersion the mixture was dried and the particles were redispersed in water. Hand sheets made from 100% Q-90 bleached softwood Kraft refined to 5-20 Canadian Standard Freeness were made according to C.P.P.A. Technical. Section. Standard C-4 and were pressed without restraining plates. They were then dried between blotters on the Emerson Speed Dryer at 200° F. The dispersion of hydroxypropyl cellulose stabilized polystyrene particles in water was diluted to various concentrations. Hand sheets were treated by soaking them in the appropriate dispersion for 30 seconds placing the sheet between the blotters and pressing one pass at 1.40 bar pressure on a Dynamic Former Press section. The hand sheet was then placed between two new blotters and was dried on the Emerson Speed Dryer for 10 minutes at 200° F. Control hand sheets were prepared in a similar manner except that water was used instead of the polymer dispersions. The brightness of the hand sheet was measured according to the description given in Canadian Pulp and Paper Technical Section Standard E-1 (brightness of pulp, paper and paper board). All testing was carried out on an Elrepho Brightness Tester.

Measurement of the opacity of sheets was performed in accordance with the guidelines given in C.P.P.A. Technical. Standard E-2 (opacity of paper). The samples were backed by a white backing of 89.0 reflectives (contrast ratio). A dispersion with a concentration of 20% w/v solids was used. After the size press treatment with the dispersion the handsheets gained 7.6% in weight and the resulting paper appeared much whiter in appearance. Optical measurements indicated the paper gained 10% in opacity and 7% in brightness. (Table 7). Electron micrography on a scanning electron miscrope showed many more white spots in the treated sample than the control at 500X. At higher magnification it was found that these white spots where "holes full of polymer balls". There was a fair drop in burst factor after treatment which was not surprising since the the deposited particles reduced the hydrogen bonding between fibers.

TABLE 7

Physical Properties of Polymer Dispersion Treated 100% Softwood Furnish Handsheets[1]

| | Control[2] | Dispersion (20% solids) Treated |
|---|---|---|
| Basis weight, g/m² | 86.8 | 90.6 |
| Opacity % | 75.8 | 85.3 |
| Elrepho #8 Brightness % | 75.3 | 82.3 |
| Burst Factor | 95.6 | 78.2 |

[1]all measurements were made at 51% RH and 73° F.
[2]handsheet treated with water in a similar manner As may readily be appreciated, the particles prepared according to the practice of the present invention may be used to provide improved opacity and brightness to paper. They provide the advantages that they are much lighter in weight than other conventional inorganic materials such as clay or titanium dioxide. The polymer particles according to the present invention have a self binding ability to paper, thus eliminating the requirement for a binding adhesive. It is believed that the steric stabilizer maintains the polymer particles as individual entities and at the same time contributes to the paper binding nature.

Furthermore the particles prepared according to the practice of the present invention may also be tailored to function as a dry toner or a liquid developer in the development of electrostatic latent images. The modifications are relatively uncomplicated in that for use as a dry toner all this is required is that the particles be dyed preferably while in dispersion and subsequently dried. For use as a liquid developer the particles are also dyed again while in dispersion, redispersed in a suitable carrier medium with the addition of a suitable charge control agent.

According to the present invention the dispersion polymerization techniques begin with a homogeneous solution of monomer in a dispersion medium, the polymer particles with the amphipathic steric stabilizer are formed in situ and the polymer is insoluble in the dispersion medium while the steric stabilizer is soluble in the dispersion medium. These latices are to be distinguished from the prior art, and in particular, the art described by Corner and Levy in that the steric stabilizer used in Corner is ionic by definition and in that the surfactant used in Levy is also ionic, both providing electrostatic stabilization. Both systems are controlled by the charge on the stabilizing moieties thereby limiting the latices versatility. For example, any additives to either system would seriously upset the charge distribution. Furthermore, in the Corner system it is very difficult if not impossible to obtain monodispersed particles. In contrast, the present invention provides mono dispersed particles with a nonionic steric stabilizer anchored to the surface. Furthermore by the present process monodispersed tone sized particles can be made without a mechanical grinding step.

All the patents and articles mentioned or referred to herein and hereby incorporated in their entirety into the instant specification.

While the invention has been described with particular reference to preferred embodiments, it will be appreciated by the artisan that there are many modifications and alternatives that may be used without departing from the spirit and scope of the invention. For example, while the invention has been described as essentially useful in the development of electrostatic latent image or in the manufacture of paper, it should be understood that it has equal facility for use as a chromatographic packing material in chromatographic separation. They also have utility as carriers for biomedical purposes. It is intended that such modifications and alternatives together with others are part of the present invention when encompassed by the claims that follow.

What is claimed is:

1. A stable dispersion comprising a nonionic polar dispersion medium having dispersed therein monodispersed particles comprising a thermoplastic resin core substantially insoluble in said dispersion medium formed from a styrene or butylmethacrylate containing monomer or mixtures thereof having irreversibly anchored thereto a nonionic amphipathic steric stabilizer comprising a graft copolymer having a portion formed from a styrene or butylmethacrylate containing monomer or mixtures thereof and a portion formed from hydroxyethyl cellulose, hydroxypropyl cellulose, hydroxybutyl methyl cellulose, hydroxypropyl methyl cellulose, ethyl cellulose or cellulose propionate.

2. The stable dispersion of claim 1, wherein said monodispersed particles have a size within the range from about 0.3 microns to about 15 microns.

3. The stable dispersion of claim 2, wherein said monodispersed particles have a size within the range from about 8 microns to about 10 microns.

4. The stable dispersion of claim 1, wherein said monodispersed particles are substantially spherical.

5. The stable dispersion of claim 1, wherein said polar dispersion medium is a mixture of water and alcohol.

6. The stable dispersion of claim 1, wherein said thermoplastic resin core comprises polystyrene and said nonionic amphipathic steric stabilizer comprises a graft copolymer of polystyrene grafted with hydroxypropyl cellulose.

7. The stable dispersion of claim 1, wherein said thermoplastic resin core has a weight average molecular weight from about 10,000 to about 250,000, and said nonionic amphipathic steric stabilizer has a weight average molecular weight of from about 10,000 to about 1,000,000.

8. The stable dispersion of claim 1, wherein said amphipathic steric stabilizer comprises a hairy like graft copolymer irreversibly anchored to the core and solvated by the dispersion medium.

9. The stable dispersion of claim 1 wherein the colloidal stability is maintained in the presence of charged and uncharged additives.

10. Dry redispersable nonionic polymeric particles comprising a thermoplastic resin core formed from a styrene or butylmethacrylate containing monomer or mixtures thereof having irreversibily anchored thereto a sheath of a nonionic amphipathic steric stabilizer comprising a graft copolymer having a portion formed from a styrene or butylmethacrylate containing monomer or mixtures thereof and a portion formed from hydroxyethyl cellulose, hydroxypropyl cellulose, hydroxy butyl methyl cellulose, hydroxypropyl methyl cellulose, ethyl cellulose or cellulose propionate.

11. The dry particles of claim 10, wherein said monodispersed particles have a size within the range of from about 0.3 microns to about 15 microns.

12. The dry particles of claim 11, wherein said monodispersed particles have a size within the range from about 8 microns to about 10 microns.

13. The dry particles of claim 10, wherein said monodispersed particles are substantially spherical.

14. The dry particles of claim 10, wherein said thermoplastic resin core comprises polystyrene and said nonionic amphipathic steric stabilizer comprises a graft copolymer of polystyrene grafted with hydroxypropyl cellulose.

15. The dry particles of claim 10, wherein said thermoplastic resin core has a number average molecular weight from about 10,000 to about 250,000, and said nonionic amphipathic steric stabilizer has a weight average molecular weight of from about 10,000 to about 1,000,000.

16. The method of making a nonionic stable dispersion of polymer particles comprising dissolving a nonionic material comprising hydroxyethyl cellulose, hydroxypropyl cellulose, hydroxy butyl methyl cellulose, hydroxypropyl methyl cellulose, ethyl cellulose or cellulose propionate in a polar dispersion medium in the presence of a free radical initiator, adding a styrene or butylmethacrylate containing monomer or mixture thereof to said dispersion medium, said monomer being soluble in said dispersion medium, polymerizing said monomer in situ to form a dispersion of particles comprising a polymer core having irreversibly anchored thereto a nonionic amphipathic steric stabilizer comprising a graft copolymer having a portion formed from said hydroxyethyl cellulose, hydroxypropyl cellulose, hydroxy butyl methyl cellulose or hydroxypropyl methyl cellulose, ethyl cellulose or cellulose propionate and a portion formed from said styrene or butylmethacrylate containing monomer.

17. The method of making a stable dispersion according to claim 16, wherein said monomer is styrene and said nonionic material is hydroxypropyl cellulose.

18. The method of making a stable dispersion according to claim 17, wherein said styrene is present in an amount greater than about 15% by volume and said polymerization takes place at a temperature in excess of about 50° C.

19. The method of making a stable dispersion according to claim 16, wherein said polar dispersion medium is a mixture of water, alcohol or ether.

20. The method of making a stable dispersion according to claim 16, wherein said polymerization process provides substantially spherical monodispersed polymer particles.

21. The method of making a stable dispersion according to claim 20, wherein said monodispersed particles have a size within the range from about 8 microns to about 10 microns.

* * * * *